United States Patent [19]
Medina

[11] 3,851,449
[45] Dec. 3, 1974

[54] SUGAR CANE HARVESTER

[76] Inventor: Ramon Reyes Medina, 1113 Center Rd., Wilmington, Del. 19805

[22] Filed: June 6, 1973

[21] Appl. No.: 367,479

[30] Foreign Application Priority Data
June 8, 1972   Spain .................................. 403,670

[52] U.S. Cl..................... 56/14.3, 56/14.5, 56/16.6, 56/257
[51] Int. Cl............................................. A01d 45/10
[58] Field of Search ......... 56/14.3, 14.5, 16.4, 16.6, 56/257, 296, DIG. 15

[56] References Cited
UNITED STATES PATENTS

| | | | |
|---|---|---|---|
| 2,634,569 | 4/1953 | Raney et al. | 56/14.3 |
| 2,669,823 | 2/1954 | Kramer | 56/14.5 |
| 3,375,642 | 4/1968 | Willett | 56/14.3 X |
| 3,731,477 | 5/1973 | Coon | 56/DIG. 15 X |

*Primary Examiner*—Louis G. Mancene
*Assistant Examiner*—J. M. Eskovitz
*Attorney, Agent, or Firm*—Young & Thompson

[57] ABSTRACT

A sugar can harvester comprises a reciprocable horizontal cutting plate that is adjustable as to height. Gathering arms circulate in opposite directions in an endless path to gather the cut canes and deliver them to a endless conveyor which in turn delivers the canes to a trailer vehicle. A rotary brush above and transverse to the conveyor cleans the canes. The gathering arms are mounted on endless chains reeved about sprockets; and the chains are prevented from leaving their sprockets by endless guide rails that contact the upper sides of the arms a distance from the connection between the arms and the chains. Horizontal rods extend lengthwise on each side of the machine and are incurved at their forward ends to separate the canes of contiguous rows.

3 Claims, 5 Drawing Figures

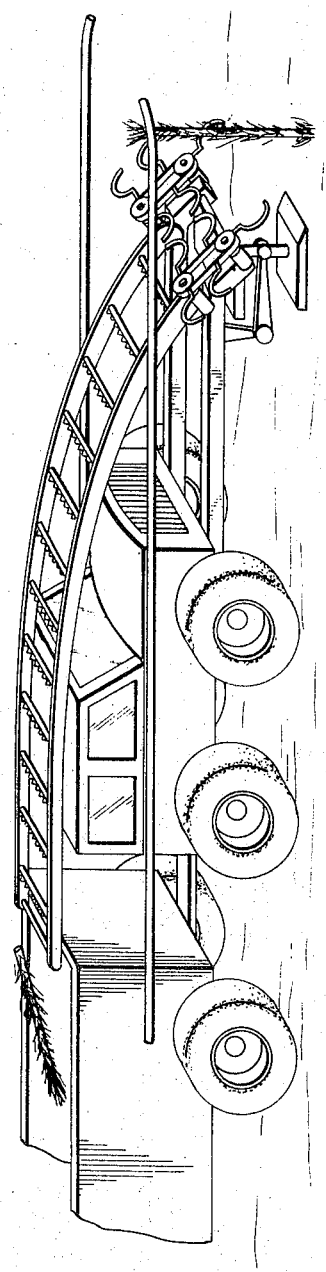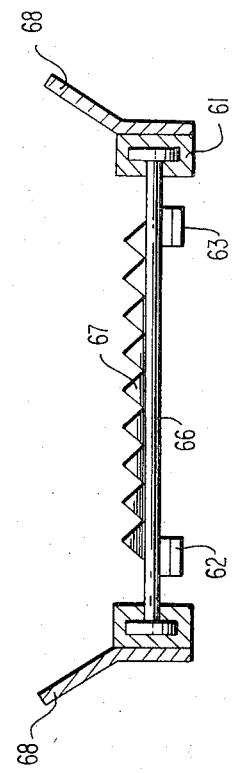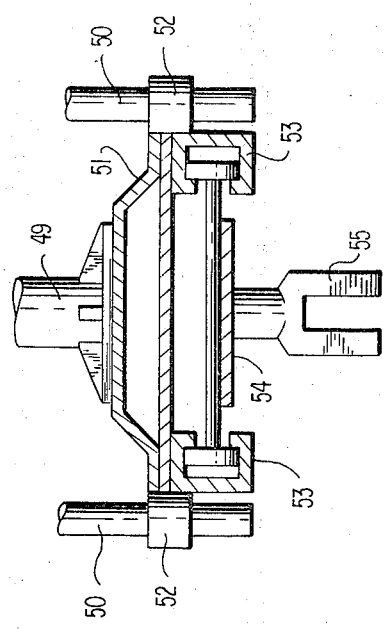

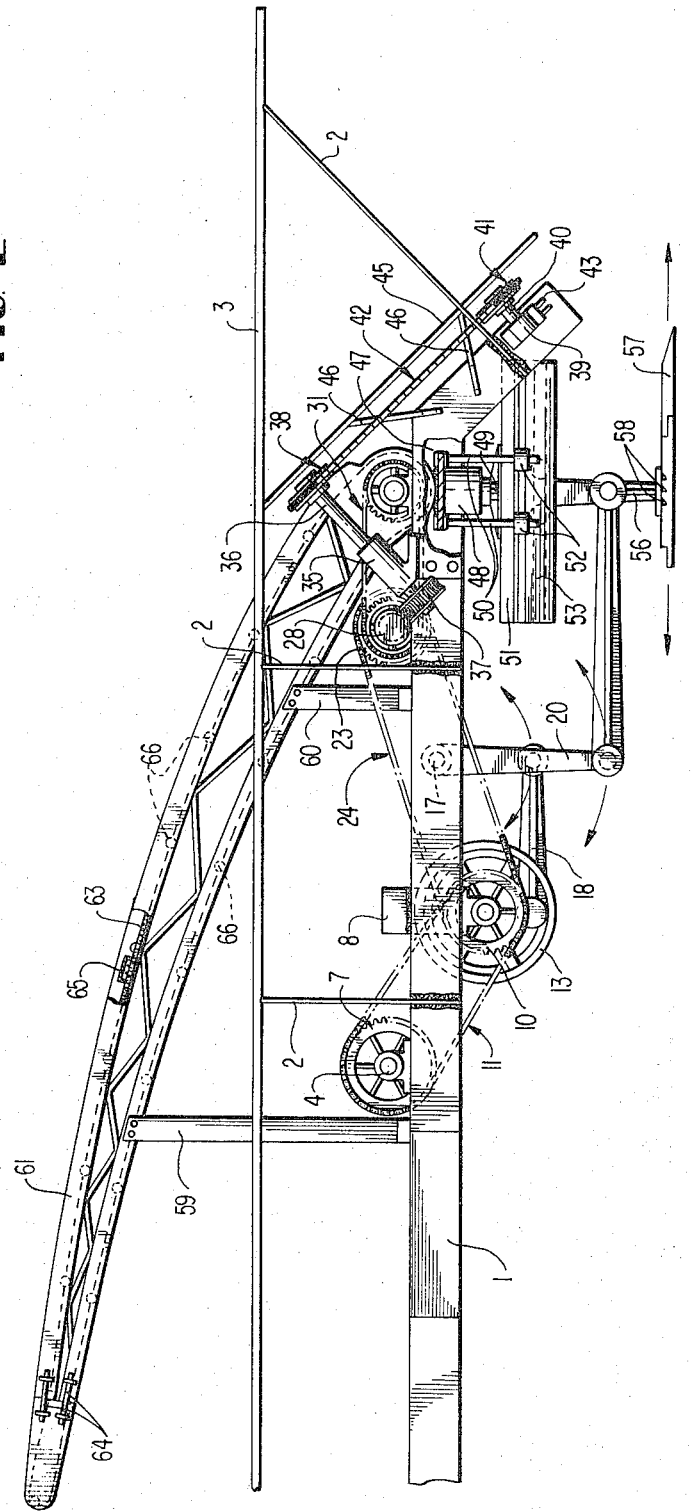

SUGAR CANE HARVESTER

The present invention relates to harvesters for sugar cane and the like, and more particularly to power-driven apparatus adapted to advance over a field of sugar cane and cut and gather the canes and store them in a trailing vehicle.

It is an object of the present invention to provide a harvester for sugar cane and the like, which has improved cutting mechanism.

Another object of the present invention is the provision of such a harvester, which has improved gathering mechanism for the harvested crop.

Still another object of the present invention is the provision of such a harvester, with improved means for separating the crop of a row to be harvested, from the crop of contiguous rows.

Yet another object of the present invention is the provision of such a harvester, with a drive means common to the cutting, gathering and conveying portions of the apparatus.

Finally, it is an object of the present invention to provide such a harvester, which will be relatively simple and inexpensive to manufacture, easy to operate, maintain and repair, and rugged and durable in use.

Other objects, features and advantages of the present invention will become apparent from a consideration of the following description, taken in connection with the accompanying drawings, in which:

FIG. 1 is a somewhat schematic perspective view of a harvester for sugar cane and the like, according to the present invention, shown in use in a field of sugar cane;

FIG. 2 is a side elevational view of the present invention;

FIG. 4 is a fragmentary cross-sectional view of the guide mechanism for the crop cutter plate; and FIG. 5 is a fragmentary cross-sectional view of the upper run of the endless conveyor that delivers the cut crop to the trailing vehicle.

Figure 3:
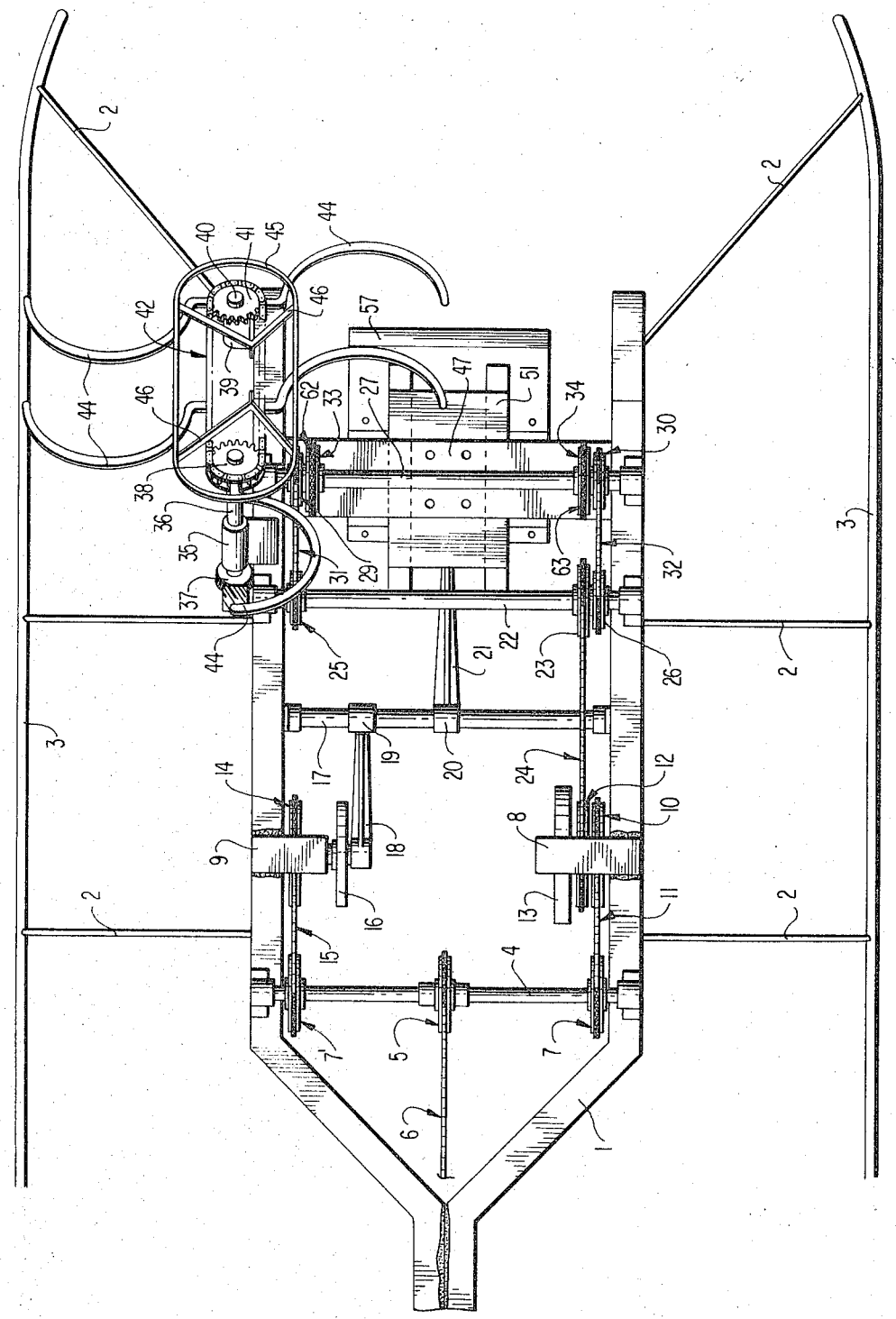
FIG. 3 is a top plan view of the present invention, with parts broken away for clarity.

Referring now to the drawings in greater detail, there is shown by way of example a sugar cane harvester according to the present invention, comprising a frame or chassis 1 by which the harvester is supported on wheels for movement over the cane field or the like. Chassis 1 is generally Y-shaped and comprised by two main portions extending from a common junction forwardly lengthwise of the harvester and on either side thereof.

A pair of bars 3 also extends lengthwise of the harvester, outwardly of and higher than the components of frame 1. Bars 3 are supported in this position by diagonally upwardly and outwardly inclined rods 2 secured to frame 1. The forward ends of bars 3 are inwardly curved and serve to separate the cane in the row to be harvested from the canes in contiguous rows.

The drive train common to all of the mechanisms to be described hereinafter, comprises a shaft 4 journalled on chassis 1 and carrying a sprocket 5 driven by chain 6 from a power source (not shown) which is preferably carried by the trailing vehicle. At its ends, shaft 4 carries sprockets 7 and 7' which drive chains 11 and 15 to rotate sprockets 10 and 14, respectively, which are journalled in bearing supports 8 and 9 carried by chassis 1.

Sprocket 14 turns a shaft journalled in support 9 on which is mounted an eccentric counterweight 16 and a crank arm that oscillates a connecting rod 18 that in turn oscillates a crank arm 20 journalled on shaft 17 which in turn is carried by frame 1. The connection of rod 18 is intermediate the length of arm 20; and at its lower end, arm 20 is pivotally connected to a further connecting rod 21 that reciprocates the cane cutting blade, as will be described hereinafter.

Sprocket 10 is mounted on a shaft on which is also mounted a sprocket 12 that drives a chain 24 that meshes with a sprocket 23 fixed to shaft 22 which is rotatably mounted on chassis 1. At its opposite ends, on the outer side of frame 1, shaft 22 carries worm gears 28 which mesh with pinions 37 on the lower ends of shafts 36 that are journalled for rotation in sleeves 35 secured to chassis 1. At their upper ends, shafts 36 carry sprockets 38. It will of course be recognized that the structure being described is provided on both sides of the harvester but has been omitted from the bottom of FIG. 3 for the purpose of clarity.

A shaft 40 is parallel to shaft 36 and is journalled for rotation in sleeve 39 on chassis 1, and carries at its upper end a sprocket 41. A chain 42 is trained about sprockets 38 and 41. A chain-tensioning device 43 of conventional construction moves sleeve 39 in a direction parallel to the chain 42 so as adjustably to tension chain 42.

Chain 42 carries a plurality of hook-like arms 44. The drive trains to the two chains 42 are so arranged that the arms 44 at their forward ends move inwardly toward each other but do not touch. Instead, they sweep substantially the entire front of the machine to gather cut canes and to deliver them to an endless conveyor by which the canes are deposited in the trailing vehicle.

A hold-down rail 45 of oval configuration has semicircular ends and straight longitudinally extending intermediate sections and is supported by rods 46 on chassis 1. Rail 45 is disposed above arms 44 and holds them down so that arms 44 do not tend to ride up and dislodge chain 42 from sprockets 38 and 41 even under the stress of heavy loads of canes to be conveyed.

The cane cutting mechanism itself comprises a horizontal plate 47 which extends between and is secured to the chassis members and which carries on its underside a vertical hydraulic cylinder 48 having a plunger 49 that depends downwardly therefrom. Hydraulic fluid under pressure is conveyed to and removed from cylinder 48 by a source of relatively high pressure fluid (not shown) to raise and lower plunger 49.

Also dependent from plate 47 are four vertical guide rods 50. At its lower end, plunger 49 carries a rectangular plate having a generally trapezoidal cross section as seen in FIG. 4; and at the corners of this plate are collars 52 which slide vertically on rods 50.

Two C-shaped channels 53 open toward each other and are carried by the underside of plate 51 and provide longitudinal guideways for wheels carried at the ends of a shoe 54 from which depends a forked rod 55 that is swingably connected to the forward end of connecting rod 51 and from which depends the vertical support 56 for the blade 57 in the form of a horizontal cutter plate having a sharp forward edge. Plate 57 is releasably secured to support 56 by conventional fasteners (not shown) and has V-shaped recesses 58 in its upper surface that receive correspondingly shaped portions on the underside of support 56, so that blade 57 and support 56 can be released and adjusted and reassembled to each other to vary the forward or rearward position of blade 57.

Shaft 22 also carries sprockets 25, 26 which mesh with chains 31, 32, respectively, which in turn are reeved over sprockets 29, 30, respectively on a shaft 27 journalled in chassis 1. Shaft 27 also carries sprockets 33 and 34, of a larger diameter than sprockets 29 and 30, over which are trained the chains 62 and 63, respectively, of an endless conveyor by which the cut and gathered canes are conveyed to the rear and discharged into the trailing vehicle. This endless conveyor is provided with a frame including supports 59 and 60 carried by chassis 1 and supporting at their upper ends the beams 61 in which the endless conveyor rides, as best seen in FIG. 5. Conventional belt tightening mechanism 64 for the tail wheel (not shown) of the conveyor is provided. Also, an access port is closed by plates 65 to permit replacement of the chain pintles 66 of the conveyor. These pintles 66 in turn carry upstanding teeth 67 which improve the conveyance of the cut canes. The conveyor trough is completed by diagonally upwardly outwardly inclined wings 68 of conventional construction. A rotary cylindrical brush (not shown) disposed above and transverse to the conveyor cleans the canes on the conveyor; and to prevent dirt being thrown by the brush onto the cleaned canes, the conveyor is covered rearwardly of the brush.

In operation, when power is furnished to the harvester through chain 6 and the chassis 1 is pushed forward over the ground by its trailing vehicle, the connecting rod 20 is oscillated in pendulum fashion, which in turn reciprocates the cutting blade 57 to improve the cutting action of the blade as the harvester advances along a row of canes. The cut canes are then gathered by the endlessly circulating arms 44 and delivered to the endless conveyor whose upper run receives and carries the canes upwardly and rearwardly as seen in FIG. 2 and dumps them into the trailing vehicle. Improved cutting action, improved gathering action and improved overall operation of the harvester are thus achieved by the present invention.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A harvester for a crop such as sugar cane and the like, comprising a chassis mounted for movement over the ground, a horizontal cutter carried by the chassis, means to reciprocate the cutter forwardly and rearwardly relative to the chassis to cut the crop, endless gathering conveyors on either side of the chassis for gathering the cut crop, an endless conveyor for receiving the cut crop from said gathering conveyors and for conveying the cut crop to the rear, power means common to said cutter and gathering conveyors and endless conveyor simultaneously to reciprocate said cutter and to circulate said gathering conveyors and said endless conveyor, said gathering conveyors comprising endless conveyor chains having gathering arms outstanding therefrom, and guide rails carried by said chassis and disposed above and contacting said gathering arms a distance from the junction of said gathering arms and the chains associated therewith.

2. A harvester as claimed in claim 1, and guide bars carried by and disposed above and outwardly of the chassis and extending lengthwise of the harvester, said guide bars having incurved forward ends to separate the crop in a row of crop to be harvested from the crop in contiguous rows.

3. A harvester as claimed in claim 1, said power means comprising drive chains and sprockets, a crank arm oscillated by said drive chains and sprockets, and a connecting rod interconnecting said crank arm and said cutter to reciprocate said cutter.

* * * * *